Jan. 23, 1951        J. E. BECKER        2,539,004
FLUID CIRCULATION CONTROL FOR FLUID COUPLINGS
Filed April 25, 1947
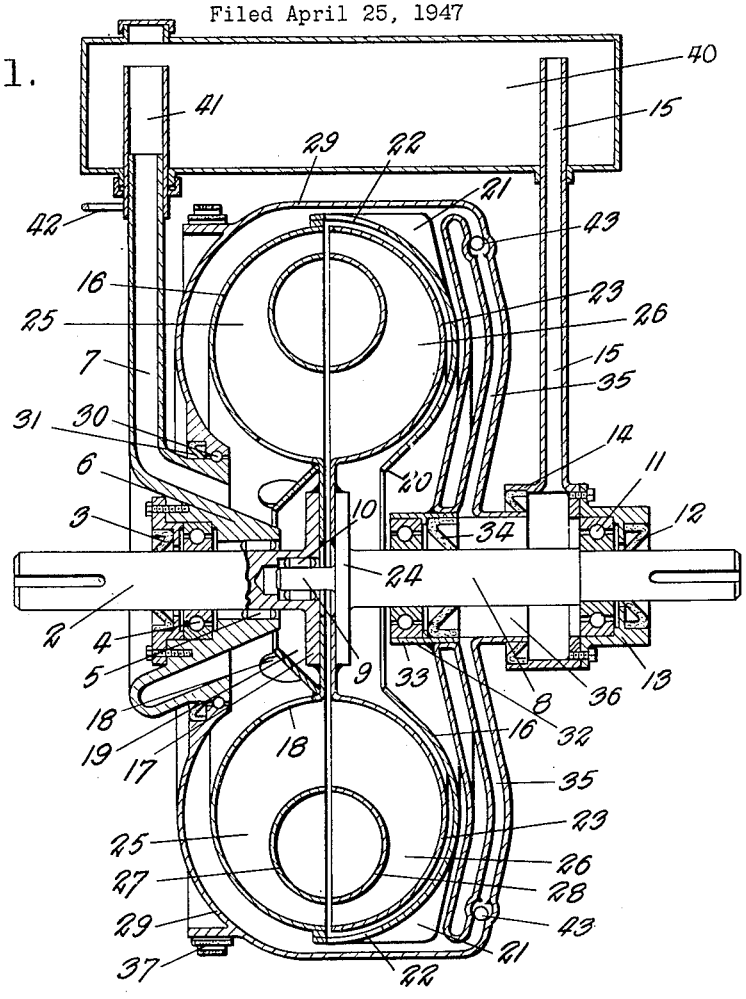
FIG. 1.
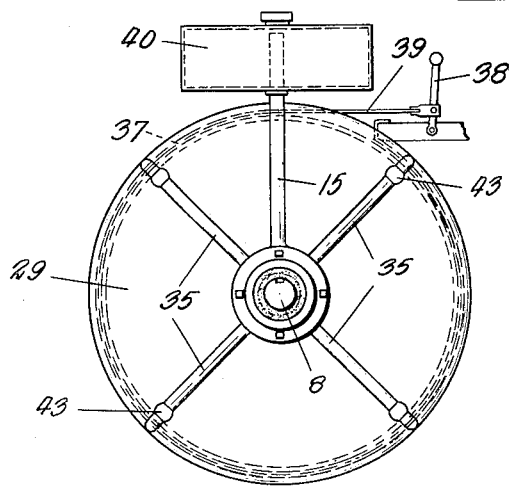
FIG. 2.
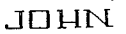
Inventor
JOHN E. BECKER
By
Attorney Patented Jan. 23, 1951

2,539,004

UNITED STATES PATENT OFFICE 2,539,004

FLUID CIRCULATION CONTROL FOR FLUID COUPLINGS

John Edward Becker, Toronto, Ontario, Canada, assignor to Atlas Polar Company Limited, Toronto, Ontario, Canada, a corporation of Canada Application April 25, 1947, Serial No. 744,000

7 Claims. (Cl. 60—54)

The invention relates to improvements in fluid circulation controls for fluid couplings, and the object of the invention is to contain the impeller and runner of the coupling in a housing which is free to rotate therewith. The impeller is furnished with centrifugal pump vanes, and a braking mechanism is provided to govern the rotative speed of the housing, whereby a variable speed differential between the impeller centrifugal pump vanes and the housing can be established to produce a resultant pumping action to remove fluid from the coupling; such fluid removal being capable of being accomplished either very rapidly or at various slower speeds, dependent upon whether the rotative movement of the housing is virtually brought to a standstill or reduced below the speed of the pump vanes.

A further and particular object of the invention is to position a fluid reservoir above the coupling and into which fluid removed from the coupling is emptied and from which the fluid returns to the coupling; the passage of fluid through the reservoir being controlled whereby any desired driven speed of the coupling may be maintained.

With the foregoing and other objects in view, as shall hereinafter appear, my invention consists of a fluid coupling constructed and arranged all as hereinafter more particularly described and illustrated in the accompanying drawing in which:

Fig. 1 is a vertical longitudinal cross-sectional view through my non-reversible type of coupling.

Fig. 2 is an end view, reduced in size, of the coupling shown in Fig. 1.

Like characters of reference indicate corresponding parts in the different views of the drawing.

Referring to Figures 1 and 2, the driving shaft 2 extends through a fluid seal ring 3 and bearing assemblies 4 and 5 contained within a stationary hub 6. A fluid feed pipe 7 extends upwardly from the hub 6. A driven shaft 8 is positioned in alignment with the driving shaft 2, and has its inner end 9 of reduced diameter and extending into a needle bearing 10 contained within the end of the driving shaft 2. The outer end of the driven shaft extends through a bearing 11 and fluid seal ring 12 contained within a stationary hub 13. The hub 13 seals the outer end of a cylindrical shell 14, from which a fluid outlet pipe 15 extends upwardly.

An impeller housing 16 of orbicular form is secured to a flange 17 on the inner end of the driving shaft 2, so that the housing rotates with the shaft. The central portion of the impeller housing is pierced by a number of orifices 18 for the passage of fluid from the feed pipe 7 to the interior of the impeller housing. A frustro-conical shaped plate 19 is secured to the inner portion of the impeller housing and constitutes a deflector to assist the centrifugal force in guiding the fluid leaving the feed pipe 7 through the orifices 18. As will be seen upon reference to Fig. 1, the impeller housing 16 is of substantially 8-shaped cross-section. The inner portion 20 of the housing 16, remote from the portion secured to the flange 17, is spaced away from the driven shaft 8. The outer face of the impeller housing 16 carries a plurality of fins 21 which act in the capacity of centrifugal pump blades, and the housing is pierced, in the vicinity of the pump blades, with a plurality of orifices 22 for the outward passage of fluid when the fins 21 are in pumping operation.

The impeller housing 16 contains a concave ring shaped runner housing 23 which has its central portion attached to a flange 24 upon the inner end of the driven shaft 8. The impeller housing 16 and the runner housing 23 carry a plurality of the usual radial blades 25 and 26 which support the usual ring members 27 and 28, so that passages for the fluid transmission of power are formed.

The impeller housing 16 is encased within an outer housing 29 which is normally freely rotatable. The driving shaft end of the housing 29 is carried upon a ball bearing 30 surrounding the hub 6, and a fluid sealing ring 31 is also provided. The driven shaft end of the housing 29 is welded, or otherwise secured, to a collar 32 which surrounds the driven shaft 8 and contains a ball bearing 33 and a fluid sealing ring 34 through which the driven shaft 8 extends. A plurality of radial pipes 35 extend inwardly from the periphery of the outer housing 29 and terminate in a chamber 36 surrounding the shaft 8 and communicating through the shell 14 with the fluid outlet pipe 15.

A brake band assembly 37 surrounds the housing 29 and is operable by a lever 38 and link connection 39. The application of the brake 37 retards or stops the rotative movement of the housing 29. A reservoir 40 is mounted above the coupling assembly. The upper end of the fluid outlet pipe 15 extends upwardly into the reservoir 40, and the upper end of the fluid feed pipe 7 is contained within a slidable regulating sleeve 41 which projects upwardly into the reservoir, and may be adjusted in height by means of a handle 42. Each of the radial pipes 35 contains a check valve 43 positioned in proximity to the periphery of the housing 29, for the purpose of preventing fluid being centrifugally forced outwardly through the pipes 35 against the inward flow of fluid under the influence of the pump fins or blades 21.

Operation

Upon reference to Fig. 1 it will be realized that the quantity of fluid admitted to the coupling from the reservoir 40 can be governed by adjustment of the height of the slidable regulating sleeve 41. When the top of the regulating sleeve is below the level of the fluid in the reservoir, fluid will flow downwardly through the pipe 7 until the fluid level in the reservoir coincides with the top of the sleeve. To put the coupling, as shown in Fig. 1, into operation, fluid is permitted to pass from the reservoir into the outer housing 29 from where it will pass through the orifices 18 into the impeller housing 16. The fluid in rotating from the impeller blades 25 will impact the runner blades 26, with the resultant rotation of the runner and the driven shaft 8. It will be apparent that a proportion of the fluid will be contained within the outer housing 29 exteriorly of the impeller housing 16, and as the outer housing 29 is free to rotate, it will be also apparent that the outer housing will be carried in rotation at substantially the same speed as the impeller housing. Under these conditions the fins 21 will have no pumping capacity, due to the fins and the outer housing 29 having substantially the same rotative speed.

It will be readily understood that if the rotative speed of the outer housing 29 is reduced below the rotative speed of the fins 21, that a centrifugal pumping action will immediately occur, and fluid will be pumped from the housing 29 through the pipes 35, and fluid outlet pipe 15 into the reservoir 40. The check valves 43 are designed to permit fluid to pass from the outer housing 29 through the pipes 35, but will not permit fluid to pass through the pipes 35 into the housing 29.

To remove a proportion of the fluid from the coupling in order to reduce the speed of the driven shaft 8 relatively to the speed of the driving shaft 2, it is only necessary to reduce the rotative speed of the outer housing 29, by means of the brake assembly 37, when fluid will be pumped from the coupling into the reservoir 40. The return of fluid from the reservoir into the coupling is controlled by adjustment of the height of the sleeve 41. It will therefore be appreciated, that by manipulation of the sleeve 41 and/or the brake 37, that any driven shaft speed can be obtained and retained, ranging from substantially the speed of the driving shaft, to reducing the driven shaft speed to a standstill. It will be also appreciated that by braking the outer housing 29 to a standstill, that the centrifugal pump vanes 21 on the impeller housing will immediately evacuate all fluid from the impeller.

What I claim as my invention is:

1. A fluid coupling comprising a driving shaft, a driven shaft, a bearing assembly in which the driving shaft is mounted, a bearing assembly in which the driven shaft is mounted, an orbicular impeller shell of substantially S-shaped cross-section and which is secured to the driving shaft, a plurality of radial impeller blades secured within one half of the shell, a concave ring-shaped runner housing secured to the driven shaft and contained within the other half of the impeller shell, a plurality of radial runner blades secured within the runner housing and adapted to be driven by the impeller blades through the medium of a fluid, a freely rotatable housing in which the impeller shell is contained, radially positioned centrifugal pump fins protruding from the outer face of the portion of the impeller shell in which the runner housing is contained, the impeller shell being pierced with fluid outlet orifices adjacent to the fins, bearing assemblies upon said first bearing assembly and the driven shaft and upon which the rotatable housing is freely mounted, fluid normally contained within the impeller shell and in the freely rotatable housing, a brake engageable by the housing and by which its rotative speed may be retarded, a fluid reservoir, and fluid inlet and outlet conduits extending between the fluid reservoir and the coupling.

2. A fluid coupling assembly as claimed in claim 1, wherein the impeller shell outlet orifices are positioned between the fins.

3. A fluid coupling assembly as claimed in claim 1, wherein the fluid outlet conduit extends from the peripheral portion of the rotatable housing to the reservoir, and the fluid inlet conduit extends from the reservoir to the central portion of the rotatable housing.

4. A fluid coupling assembly as claimed in claim 1, wherein the impeller shell is pierced by a plurality of fluid inlet orifices in the wall of the central part of the portion of the shell containing the impeller blades, the fluid inlet conduit extending from the reservoir to the central part of the impeller shell containing the inlet orifices.

5. A fluid coupling assembly as claimed in claim 1, wherein the impeller shell is pierced by a plurality of fluid inlet orifices in the wall of the central part of the portion of the shell containing the impeller blades, the fluid inlet conduit extending from the reservoir to the central part of the impeller shell containing the inlet orifices, and wherein the outlet conduit extends from a rotatable fluid chamber surrounding the driven shaft, and a plurality of fluid outlet pipes extending from the fluid chamber to the peripheral portion of the freely rotatable housing in which the impeller shell is contained.

6. A fluid coupling assembly as claimed in claim 1, wherein the impeller shell outlet orifices are positioned between the fins, and wherein the impeller shell is pierced by a plurality of fluid inlet orifices in the wall of the central part of the portion of the shell containing the impeller blades, the fluid inlet conduit extending from the reservoir to the central part of the impeller shell containing the inlet orifices.

7. A fluid coupling assembly is claimed in claim 1, wherein the impeller shell is pierced by a plurality of fluid inlet orifices in the wall of the central part of the portion of the shell containing the impeller blades, the fluid inlet conduit extending from the reservoir to the central part of the impeller shell containing the inlet orifices, a rotatable fluid chamber surrounding the driven shaft and from which the outlet conduit extends to the reservoir, a plurality of fluid outlet pipes extending from the fluid chamber to the peripheral portion of the freely rotatable housing in which the impeller shell is contained, and wherein the impeller shell outlet orifices are positioned between the fins.

JOHN EDWARD BECKER.

(References on following page)

REFERENCES CITED

The following references are of record in the file of this patent:

UNITED STATES PATENTS

| Number | Name | Date |
|---|---|---|
| 1,882,222 | Lewis | Oct. 11, 1932 |
| 1,975,505 | Föttinger | Oct. 2, 1934 |
| 1,987,985 | Bauer et al. | Jan. 15, 1935 |
| 2,050,550 | Yingling | Aug. 11, 1936 |
| 2,078,597 | Beaumont | Apr. 27, 1937 |
| 2,187,069 | Alison | Jan. 16, 1940 |
| 2,265,107 | Sinclair | Dec. 7, 1941 |
| 2,343,786 | Martin | Mar. 7, 1944 |